US010668385B2

(12) United States Patent
Cook et al.

(10) Patent No.: US 10,668,385 B2
(45) Date of Patent: Jun. 2, 2020

(54) PROTECTING AGAINST POLYMORPHIC CHEAT CODES IN A VIDEO GAME

(71) Applicant: VALVE CORPORATION, Bellevue, WA (US)

(72) Inventors: John Cook, Seattle, WA (US); Martin Otten, Seattle, WA (US)

(73) Assignee: Valve Corporation, Bellevue, WA (US)

(*) Notice: Subject to any disclaimer, the term of this patent is extended or adjusted under 35 U.S.C. 154(b) by 1107 days.

(21) Appl. No.: 15/078,567

(22) Filed: Mar. 23, 2016

(65) Prior Publication Data
US 2016/0199737 A1 Jul. 14, 2016

Related U.S. Application Data

(62) Division of application No. 12/343,350, filed on Dec. 23, 2008, now Pat. No. 9,317,684.

(51) Int. Cl.
| | |
|---|---|
| *A63F 13/75* | (2014.01) |
| *H04L 29/06* | (2006.01) |
| *G06F 21/55* | (2013.01) |
| *A63F 13/335* | (2014.01) |
| *G07F 17/32* | (2006.01) |

(52) U.S. Cl.
CPC ............ *A63F 13/75* (2014.09); *A63F 13/335* (2014.09); *G06F 21/552* (2013.01); *G07F 17/3241* (2013.01); *H04L 63/1416* (2013.01); *H04L 63/1425* (2013.01); *A63F 2300/535* (2013.01)

(58) Field of Classification Search
CPC ...... A63F 13/75; A63F 13/335; G06F 21/552; H04L 63/1416; H04L 63/1425; G07F 17/3241
See application file for complete search history.

(56) References Cited

U.S. PATENT DOCUMENTS

| | | | | |
|---|---|---|---|---|
| 5,361,379 A | * | 11/1994 | White | G01P 1/10 340/937 |
| 5,421,006 A | * | 5/1995 | Jablon | G06F 21/565 713/187 |

(Continued)

OTHER PUBLICATIONS

Wiley, 'Dictionary of Economics: weighted average,' 1995, John Wiley & Sons, Inc., p. 1 (Year: 1995).*

(Continued)

*Primary Examiner* — Jay Huang
*Assistant Examiner* — Courtney Patrice Jones
(74) *Attorney, Agent, or Firm* — Seed IP Law Group LLP

(57) ABSTRACT

Embodiments are directed towards protecting against polymorphic cheat codes in a video game environment. A detour analyzer analyzes game code in client memory for possible hooks to parasite code. For each detected hook to parasite code, hook and/or parasite information is determined to generate a hook/parasite signatures, which are sent to a remote network device. Based on the hook/parasite signatures a weighted combination of scores are generated that is useable to determine a probability value that the parasite code is cheat code. If the determined probability value indicates cheat code, the user of the client device may be banned from future game play. Additionally, the hook/parasite signature information may be used to update the data store to detect polymorphic changes in the cheat code.

20 Claims, 6 Drawing Sheets

(56) References Cited

U.S. PATENT DOCUMENTS

| | | | |
|---|---|---|---|
| 7,517,282 B1* | 4/2009 | Pryor | A63F 13/12 463/42 |
| 7,617,534 B1* | 11/2009 | Szor | G06F 21/575 713/188 |
| 2002/0087883 A1 | 7/2002 | Wohlgemuth et al. | |
| 2002/0091644 A1 | 7/2002 | Wong et al. | |
| 2003/0236986 A1 | 12/2003 | Cronce et al. | |
| 2004/0061676 A1 | 4/2004 | Sitrick et al. | |
| 2004/0062393 A1 | 4/2004 | Sitrick et al. | |
| 2004/0078585 A1 | 4/2004 | Cronce et al. | |
| 2006/0271921 A1 | 11/2006 | Cronce et al. | |
| 2006/0294592 A1* | 12/2006 | Polyakov | G06F 21/566 726/24 |
| 2007/0061890 A1 | 3/2007 | Sitrick et al. | |
| 2007/0208664 A1 | 9/2007 | Ortega | |
| 2007/0250781 A1 | 10/2007 | Dolph | |
| 2008/0235802 A1 | 9/2008 | Venkatesan et al. | |
| 2010/0100963 A1* | 4/2010 | Mahaffey | G06F 21/564 726/25 |

OTHER PUBLICATIONS

Laurens, 'A Novel Approach to the Detection of Cheating in Multiplayer Online Games,' Jul. 1, 2007, IEEE, 12th IEEE International Conference on Engineering Complex Computer Systems (ICECCS 2007), p. 97-106 (Year: 2007).*

"Rootkit," Wikipedia, the free encyclopedia, http://en.wikipedia.org/wiki/Rootkit, 10 pages, created May 9, 2003.

"Dictionary of Economics": weighted average. (1995). In Dictionary of Economics, Wiley, Retrieved from http://www.credoreference.com/entry/wileyecon/weighted_average.

"Anti-Piracy Security Mechanisms in PC Games," UW Computer Security Research and Course Blog, Jan. 11, 2008, 6 pages, http://cubist.cs.washington.edu/Security/2008/01/11/anti-piracy-secur . . . (accessed Sep. 4, 2008).

Video game industry—Wikipedia, http://en.wikipedia.org/wiki/Video_game_industry, accessed Dec. 23, 2008, 7 pages.

Cheating—Wikipedia, http://en.wikipedia.org/w/index.php?title=cheating&printable=yes, accessed Dec. 23, 2008, 23 pages.

Stelter, Brian "Online Games by the Hundreds, With Tie-Ins", published Mar. 18, 2008, http://www.nytimes.com/2008/03/18/business/media/18adco.html? , accessed Dec. 23, 2008, 4 pages.

* cited by examiner

PROTECTING AGAINST POLYMORPHIC CHEAT CODES IN A VIDEO GAME

This is a Division of application Ser. No. 12/343,350, filed Dec. 23, 2008, the entirety of which is incorporated herein by reference.

FIELD OF THE INVENTION

The present invention relates generally to computer security and more particularly, but not exclusively, to detecting computer game cheat using detection and analysis of parasitic modifications of the computer game.

BACKGROUND OF THE INVENTION

Cheating involves an act of lying, deception, fraud, trickery, imposture, or imposition. Such actions are often used to create an unfair advantage over another, and may be done for the cheater's own selfish interest. While many people consider cheating to be a violation of a mutually agreed upon rule, boundary, agreement, or the like, there are sometimes areas where at least some people may perceive cheating to be, to some extent, acceptable. Other people may find, however, cheating to be unacceptable in virtually any situation.

One such area in which cheating may be found is in computer video games. In some situations, cheating allows a player to complete a game at an accelerated speed. This may be desirable, for example, to a casual player that would prefer to use the game as a temporary diversion rather than to spend hours to complete the game. For single-player games, such cheating might be considered, by some, as less offensive. However, in online games involving several players, cheating is more often considered to be unacceptable. Such cheating in online multi-player games, gives the cheater an unfair advantage over the other players. Therefore, in some online game arenas, cheating is not only prohibited, but, should a player be caught cheating, they may be banned from the game. Other actions might also be taken. This may especially be true in gaming arenas that provide a reward, such as money, acknowledgements, or the like, to a winner.

Cheating methods used in video games vary greatly. For example, a cheater might employ cheat codes which are often sequences of inputs, such as button presses, textual commands, or the like, that enable a cheater to activate features of the game to the provide an advantage to the cheater. Another method used by some cheaters is to modify existing game code. Such code modification might involve analyzing portions of the video game binary code, and changing the binary code, changing game data, or the like, towards the advantage of the cheater. Another cheat method, known as game training, modifies a behavior of the game, by freezing a memory address, disallowing the game from changing information stored at that memory address. This enables the cheater to manipulate the data in the memory address to suit the cheater's desire. Cheat methods also may involve modifying other sections of the game once it is loaded into memory for game play.

While some game developers, tournament sponsors, and even other game players, have attempted to develop various approaches to detecting cheaters, because cheaters often vary their methods for cheating, many such approaches have been less than successful. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings wherein.

DETAILED DESCRIPTION OF THE INVENTION

Figure 1:
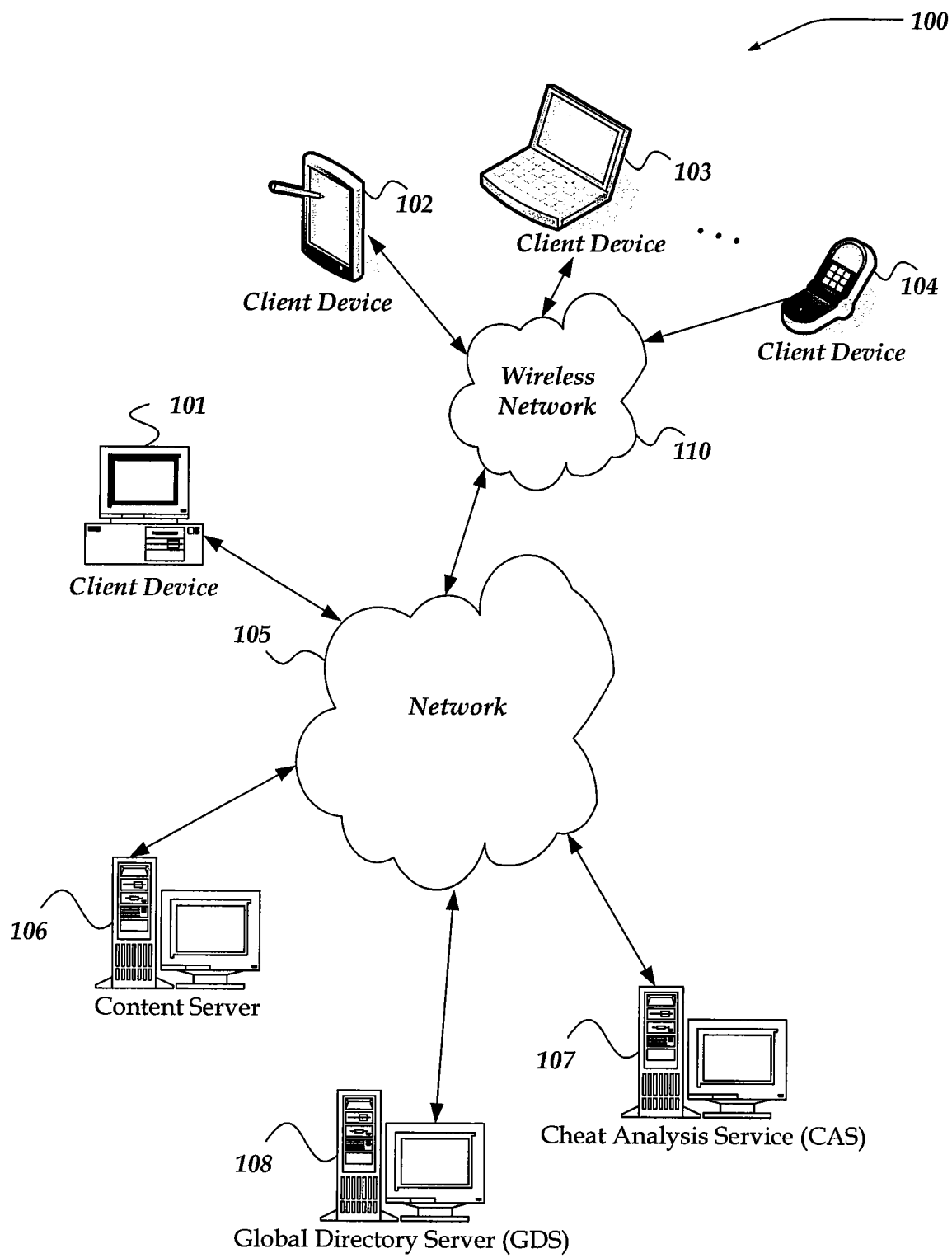
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "hook" refers to any of a variety of coding mechanisms configured to branch and/or otherwise redirect an execution flow of code to another location other than within a sequential execution flow. Hooks may be implemented using jump instructions, branch instructions, go to instructions, or the like. Typically, such hooks are configured to branch to another sequence or execution flow of code, and then, upon completion of execution of that code, another hook may be used to branch or jump back to some location in the 'original' code sequence flow.

As used herein, the term "cheat code" refers to any software code that is configured to change a result of other software code in an unauthorized, improper way. In the domain of video game play, cheat code as described above, refers to code that is arranged to enable a user to obtain an unfair advantage during game play. Cheat code is not limited, however, to game play. Cheat code may also be used to modify other types of code for unauthorized, improper reasons. Thus, cheat code may also include code that is provided to modify a tax software application, a browser application, or the like improperly.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards detecting cheat codes in a video game environment, even where the cheat code might have undergone one or more changes (e.g., polymorphic changes). Within a client device, a detour analyzer is configured to analyze game code to determine if it is modified with hooks to suspect code. Suspect code may also be referred to as parasite code. If a hook is detected to such parasite code, the game code may be further analyzed to extract information about the hook event and code information about where in the parasite code the hook action is directed. For each hook detected in the game code, a hook signature may be generated based on the extracted information. Such extracted information may include, but is not limited to address information about where in the game code the hook is located, information about what code was modified in the game code, a landing offset in the parasite code, as well as some amount or snippet of the parasite code in proximity to the landing address within the parasite code. Additionally, a parasite signature may also be generated that may include information such as the whether the parasite code is modified to attempt to hide it, whether selected text strings are found within the parasite code, as well as other information about the parasite code. Modifications to hide the parasite code might take the form of destroying and/or otherwise obfuscating a format header to the parasite code, such as a Portable Executable (PE) program header, a Common Object File Format (COFF) header, or the like. In any event, a combination of hook signatures and parasite signature may then be sent over a network to a remote network device for detection of possible cheat codes.

The hook/parasite signatures are then analyzed for known cheat elements. Based on the analysis, a probability value is determined that may be used to determine whether the parasite code is cheat code. If the determined probability value indicates that the parasite code is cheat code, the user of the client device may be banned from a future game play.

Based on policy, other game cheat prevention actions may be taken instead of or in addition to banning.

Additionally, if some hook/parasite signatures provide code elements that are not identifiable as cheat elements, but the overall parasite code is determined to be cheat code, then the unidentified code elements may be marked as cheat elements. The presence of some of these unidentified code elements in a subsequent analysis may be indicate possible changes being made to the parasite code to hide its intended purpose—of performing game cheats. Therefore, by marking them as cheat elements, parasite code may be detected even when it has undergone some level of polymorphic changes.

It should be noted that while a game code environment is employed to illustrate various embodiments for detecting cheat codes, the present invention is not limited to merely game code environments. For example, in another embodiment, the code being analyzed for modification might include financial software, such as tax software, browser applications, or other software, that might be modified for improper purposes such as theft of identity, or the like.

Illustrative Operating Environment

FIG. 1 illustrates a block diagram generally showing an overview of one embodiment of a system in which the present invention may be practiced. System 100 may include many more components than those shown in FIG. 1. However, the components shown are sufficient to disclose an illustrative embodiment for practicing the present invention. As shown in the figure, system 100 includes client devices 101-104, content server 106, Cheat Analysis Service (CAS) 107, Global Directory Server (GDS) 108, and network 105.

One embodiment of a client device usable as one of client devices 101-104 is described in more detail below in conjunction with FIG. 2. Briefly, however, client devices 102-104 may include virtually any mobile computing device capable of receiving and sending a message over a network, such as network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, components to a computer application, such as a video game, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardani-Bey's IRC (mIRC), Jabber, or the like, between another computing device. However, the present invention is not limited to these message protocols, and virtually any other message protocol may be employed.

Client devices 101-104 may further be configured to enable a user to request and/or otherwise obtain various computer applications, including, but not limited to video games. In one embodiment, the computer application may be obtained via a portable storage device such as a CD-ROM, a digital versatile disk (DVD), optical storage device, magnetic cassette, magnetic tape, magnetic disk storage, or the like. However, in another embodiment, client devices 101-104 may be enabled to request and/or otherwise obtain various computer applications over a network, such as from content server 106, or the like. It should be noted that while, some embodiments are directed towards computer applications, the invention is not so limited. Thus, in another embodiment, the request and access may be made to any of a variety of digital executable content, including, but not limited to motion pictures, movies, videos, music, interactive media, audios, or the like.

In one embodiment, a user requesting a computer application, or other digital content, may be asked to register with an application provider to enable access and/or execution of the application. Registration may be performed using any of a variety of mechanisms. For example, an end-user of client devices 101-104 may employ an activation key, a user name/password, private account credentials, or the like, to register and/or authenticated for installation and/or execution of the computer content. In one embodiment, client devices 101-104 may be authenticated through CAS 107 and/or content server 106, or the like, and registered to execute the digital content by accessing the content through GDS 108, content server 106, or the like. In one embodiment, the authentication might be useable to enable the user to receive digital rights sufficient to access and/or otherwise obtain at least a subset of the computer application, or other digital content.

In one embodiment, as described in more detail below, client devices 101-104 may also receive a downloadable component, such as a detour analyzer, or the like, that is configured to monitor the requested application for modifications from a defined configuration. The detour analyzer might use a defined configuration of a game client application, or the like, that may be secured from being modified.

The detour analyzer might be downloaded with the requested application, or at any time before and/or after the requested application is provided to the requesting client device. If the detour analyzer determines that the requested application has been modified at the client device, the detour analyzer may then examine the modifications.

It is recognized that a requested application may be modified for any of a variety of reasons, some of which are legitimate, some of which might not be legitimate. For example, because memory within a client device may have problems, an operating system on the client device might modify an executable of the application. Legitimate modifications might also include modifications due to other client device differences, including, but not limited to operating system configurations, device driver configurations, and/or other hardware and/or software configurations of the client device.

Suspect modification might be based, for example, on a presence of a new hook within the requested application that is not in the defined version of the application that may direct code execution flow to another section of memory that is not associated with recognized, legitimate code. Thus, the detour analyzer is configured to analyze the modifications detected in the requested application as it may reside in memory of the client device to determine whether the modifications are legitimate, or suspect. If a hook to suspect code is detected, the detour analyzer may be configured to provide information to CAS 107 as described in more detail below that is useable to detect if the requested application is modified for cheat purposes.

Network 105 is configured to couple one computing device and its components with other computing devices. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 104 with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, network 105 may include virtually any wireless and/or wired communication mechanism by which information may travel between computing devices, another network, and the like.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

GDS 108 is configured to provide location information about content server 106, and the like, to client devices 101-104, and/or to content server 106. GDS 108 may also receive location information from content server 106, and the like. In one embodiment, the location information includes an IP address. Location information may also include a Universal Resource Locator (URL), Media Access Control (MAC) address, and the like. In one embodiment, client devices 101-104 may communicate with GDS 108 to obtain location information for content server 106, or the like.

Content server 106 may include any computing device capable of connecting to network 105 to manage delivery of components of an application, such as a game client application, or virtually any other digital content. In addition, content server 106 may also be configured to enable an end-user, such as an end-user of client devices 101-104, to selectively access, install, and/or execute the application based on authentication of a user of the client device.

Content server 106 may further download to client devices 101-104 the detour analyzer for use in detecting modifications to the requested game client application, or the like. Content server 106 may obtain the detour analyzer from CAS 107, in one embodiment, or provide information to CAS 107 that enables CAS 107 to download the detour analyzer to client devices 101-104. In one embodiment, the detour analyzer is configured with information about how to communicate with CAS 107, including, but not limited to a network address of CAS 107, a protocol format, and the like. In one embodiment, the communications between CAS 107 and the detour analyzer might employ an encrypted connection, or other form of security, including but not limited to Secure Sockets Layer/Transport Layer Security (SSL/TLS), or the like. In another embodiment, the information transmitted between the detour analyzer and CAS 107 might be encrypted.

One embodiment of a network device usable as CAS 107 is described in more detail below in conjunction with FIG. 3. Briefly, however, CAS 107 includes virtually any computing device that is configured to receive information about modifications to an application residing on client devices 101-104 and to determine whether such modifications indicate an attempt employ cheat code. If CAS 107 determines that cheat code is detected with a threshold level of probability, CAS 107 may then impose restrictions on subsequent use of the modified application. For example, CAS 107 might inhibit a user to participate in subsequent interactive, multi-player game play for some time period.

CAS 107 may also determine that information about the modification is insufficient, based in part on the threshold level of probability, to detect an attempt to employ cheat code. CAS 107 may then maintain information about the modifications, suspect code, and the like, for future analysis, and/or subsequent detections.

Devices that may operate as CAS 107, content server 106, and/or GDS 108 include personal computers, desktop computers, multiprocessor systems, microprocessor-based or programmable consumer electronics, network PCs, servers, and the like.

Moreover, although CAS 107, content server 106, and GDS 108 are described as distinct servers, the invention is not so limited. For example, one or more of the functions associated with these servers may be implemented in a single server, distributed across a peer-to-peer system structure, or the like, without departing from the scope or spirit of the invention.

Illustrative Client Device

Figure 2:
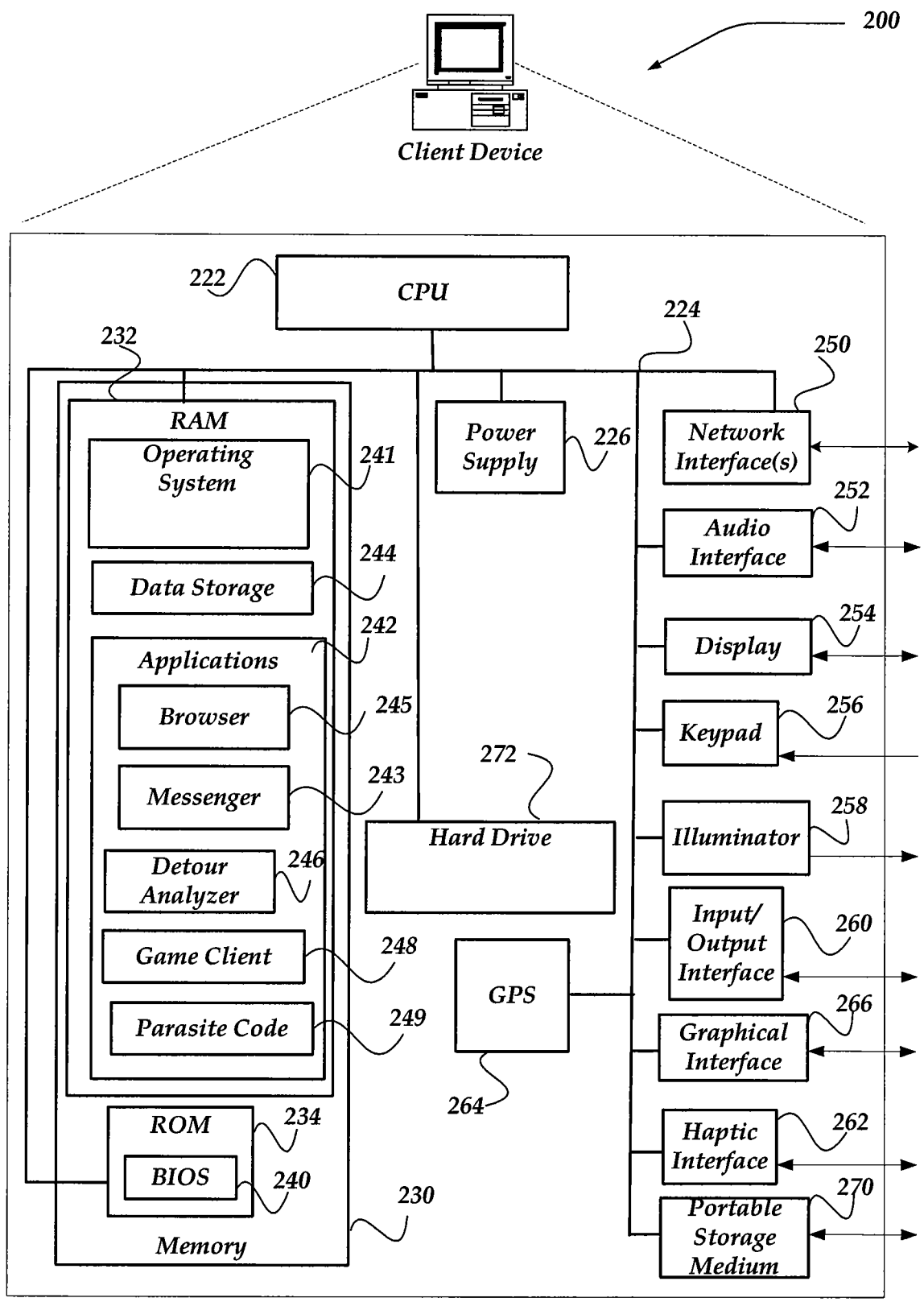
FIG. 2 shows one embodiment of a client device for use in the environment of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252 that may be configured to receive an audio input as well as to provide an audio output, a display 254, a keypad 256, an illuminator 258, an input/output interface 260, a haptic interface 262, and a global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery. Client device 200 may also include a graphical interface 266 that may be configured to receive a graphical input, such as through a camera, scanner, or the like.

Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth, Wi-Fi, Zigbee, UMTS, HSDPA; WCDMA, WEDGE, or any of a variety of other wired and/or wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may, through other components, provide other information that may be employed to determine a geo physical location of the device, including for example, a MAC address, IP address, or other network address.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications and/or other data. For example, data storage 244 may also be employed to store information that describes various capabilities of client device 200, a device identifier, and the like. The information may then be provided to another device based on any of a variety of events, including being sent as part of a header during a communication, sent upon request, or the like.

In one embodiment, data storage 244 may also include cookies, portions of a computer application, user preferences, and/or other digital content, and the like. At least a portion of the stored data may also be stored on an optional hard disk drive 272, optional portable storage medium 270, or other storage medium (not shown) within client device 200.

Applications 242 may include computer executable instructions which, when executed by client device 200, transmit, receive, and/or otherwise process messages (e.g., SMS, MMS, IMS. IM, email, and/or other messages), audio, video, and enable telecommunication with another user of another client device. Other examples of application programs include calendars, browsers, email clients, IM applications, VOIP applications, contact managers, task managers, database programs, word processing programs, security applications, spreadsheet programs, search programs, and so forth. Applications 242 may further include browser 245, messenger 243, game client 248, and secrets manager 246. In one embodiment, game client 248 may include secrets verification code 249, as described further below.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed.

Game client 248 represents a game application; however, game client 248 is not limited to game applications, and may also represent virtually any computer application, or other digital content. Game client 248 may be obtained over a network, and/or through any of variety of other mechanisms including, but not limited to a portable computer readable storage medium, such as a portable memory device, a DVD, or the like.

Detour analyzer 246, as described above, is configured to analyze game client 248, or other executable applications, for modifications from a defined configuration. Detour analyzer 246 may employ any of a variety of mechanisms to detect modifications, including, but not limited to a binary comparison between portions of game client 248 and the defined configuration. In one embodiment, detour analyzer 246 might generate a hash, perform a cyclical redundancy check (CRC), or the like, on portions of game client 248 to detect changes in game client 248.

If detour analyzer 246 detects a change in a portion of game client 248, detour analyzer 246 may then proceed to dissemble, or perform other actions, to determine the type of change in game client 248. For example, as noted elsewhere, the change might include inserting a jump, branch, go to, or other type of hook instruction that is configured to cause an execution flow of game client 248 to be diverted to another location not identified within the defined configuration.

Detour analyzer 246 may then perform additional analysis to determine a landing address for the hook. If detour analyzer 246 determines that the landing address is legitimate for a variety of reasons, detour analyzer 246 may select to ignore the modification. For example, if the hook is determined to be implemented into game client 248 because of a problem with RAM 232, or similar problems with client device 200, detour analyzer 246 may ignore the modification.

Detour analyzer 246, however, determine that the hook diverts flow to parasite code 249. Parasite code 249 represents any of a variety of suspect code for which a hook within game client 248 directs execution flow. Detour analyzer 246 may then attempt to analyze parasite code 249 to attempt to identify the code as cheat code, legitimate code, or suspect code for which additional analysis is justified.

For example, code programs generally include something known as a format header portion. Such files include, for example, Portable Executable (PE) format information, Common Object File Format (COFF) format information, and the like. A PE file, for example, may include a number of headers and sections that tell a dynamic linker how to map the file into memory. It may generally be expected, therefore, that legitimate program code would like PE, COFF, PE/COFF, or similar header information. Such information may be search for, and if found, used to determine additional information about the program, including, for example, a program name, a signature of the code, or the like. For example, a checksum may be obtained based on using a memory map address from the PE of parasite code 249. The checksum may then be used as a signature. The program name, signature, or similar information may then be used to determine if the code is cheat code, legitimate code, or unrecognized, and therefore deserving of additional examination.

However, if this header information is found to have been destroyed, deleted, or otherwise obfuscated, detour analyzer 246 may determine that an attempt has been made to hide an intent of parasite code 249. Such attempt would then make parasite code 249 highly suspect as cheat code and therefore justify further analysis.

Detour analyzer 246 may then proceed to obtain various information about the hook, and parasite code 249 to generate a hook description, called a hook signature, and a parasite signature. Detour analyzer 246 may detect a plurality of hooks, resulting in generating a plurality of different hook signatures for parasite code 249. Hook signatures and parasite signatures are described in more detail below in conjunction with FIG. 4.

Detour analyzer 246 may then send to a remote network device, such as CAS 107 of FIG. 1, the generated hook signatures and parasite signature for additional analysis. Detour analyzer 246 may employ a process such as described below in conjunction with FIG. 5 to perform at least some of its actions.

Illustrative Network Device

Figure 3:
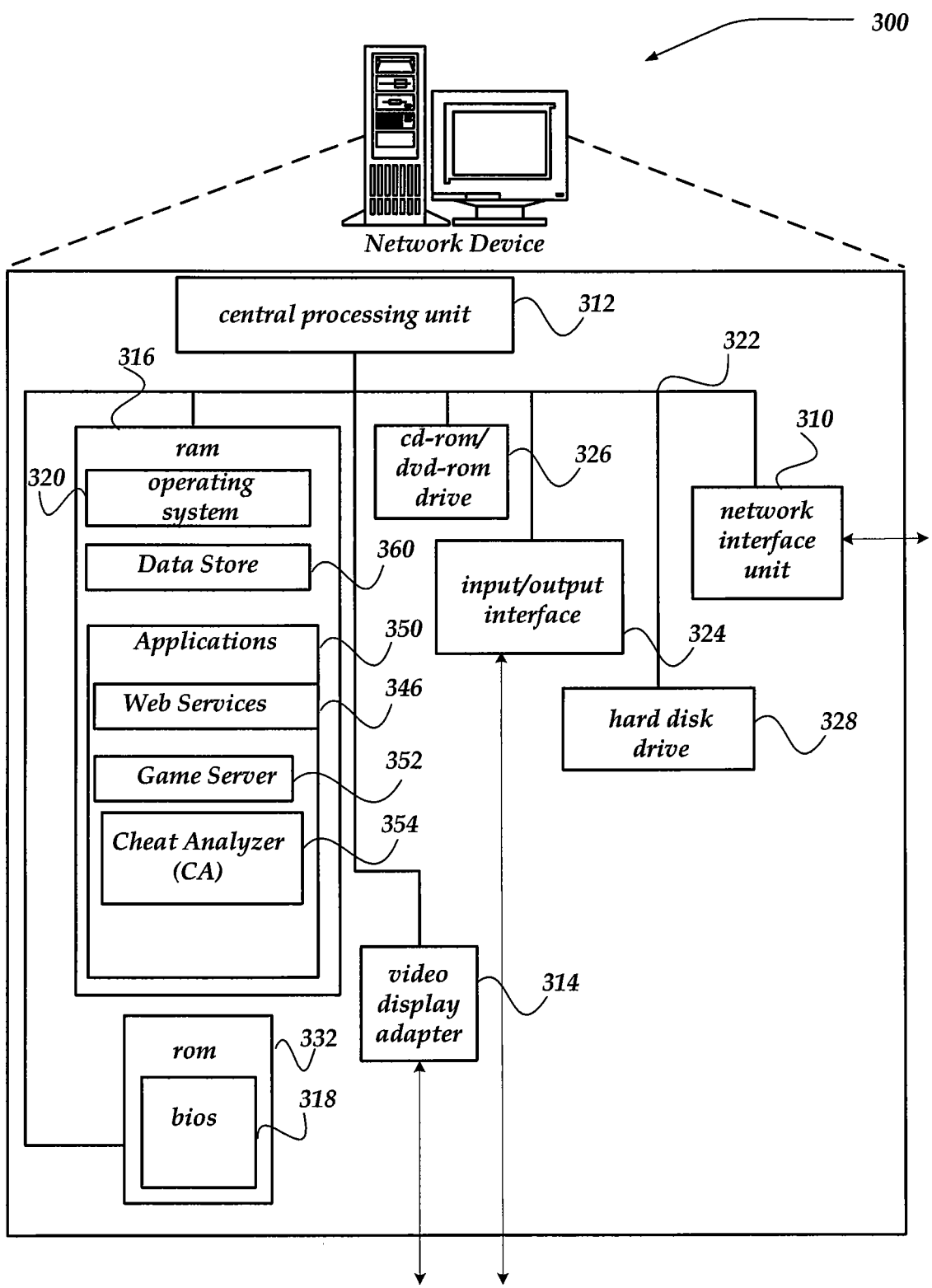
FIG. 3 shows one embodiment of a network device for use in managing distribution of an application configured to use analyzing signature information about possible cheat activities.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, CAS 107 of FIG. 1, integrated with content server 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, and removable storage device 326 that may represent a tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol, Wi-Fi, Zigbee, WCDMA, HSDPA, Bluetooth, WEDGE, EDGE, UMTS, or the like. Network interface unit 310 is sometimes known as a transceiver, transceiving device, or network interface card (NIC).

The mass memory as described above illustrates another type of computer-readable media, namely computer storage media. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Applications 350 may also include data stores 360, web services 346, game server 352, and cheat analyzer (CA) 354.

Web services 346 represent any of a variety of services that are configured to provide content over a network to another computing device. Thus, web services 346 include for example, a web server, messaging server, a File Transfer Protocol (FTP) server, a database server, a content server, or the like. Web services 346 may provide the content over the network using any of a variety of formats, including, but not limited to WAP, HDML, WML, SMGL, HTML, XML, cHTML, xHTML, or the like. In one embodiment, web services 346 may be used to enable a user to register for access to a game client application, be authenticated for downloading, and/or playing of the game client application.

Data stores 360 includes virtually any component that is configured and arranged to store data including, but not limited to user preference data, log-in data, user authentication data, cheat code information, cheat prevention policies, and the like. Data store 360 also includes virtually any component that is configured and arranged to store and manage digital content, such as computer applications, video games, and the like. As such, data stores 360 may be implemented using a data base, a file, directory, or the like.

Game server 352 is configured to manage delivery of content, including components of the application, to a client device, such as clients 101-104 of FIG. 1. Typically game server 352 may provide components to an application, such as a game application to the client device over a network. At least one of the components provided is encrypted using any of a variety of encryption mechanisms. For example, in one embodiment of the invention, Crypto++, an open-source class library of cryptographic techniques, is employed in encrypting or decrypting components of the application. However, virtually any other encryption and decryption mechanism, including open source, commercial, and/or proprietary may be used, including Advanced Encryption Standard (AES), RSA Labs Inc.'s (hereinafter "RSA's") RC6, IBM's MARS, TwoFish, Serpent, CAST-256, International Data Encryption Algorithm (IDEA), Data Encryption Standard (DES), Triple DES, DES-EDE2, DES-EDE3, DESX, DES-XEX3, RC2, RC5, Blowfish, Diamon2, TEA, SAFER, 3-WAY, GOST, SHARK, CAST-128, Square, Skipjack, Panama, ARC4, SEAL, WAKE, Sapphire II, BlumBlumShub, RSA, DSA, ElGamal, Nyberg-Rueppel (NR), Blum-Goldwasser, Rabin, Rabin-Williams (RW), LUC, LUCELG, ECDSA, ECNR, ECIES, ECDHC, ECMQVC, and the like.

Game server 352 may also provide a detour analyzer to a client device for use in detecting modifications to the provided game client, or other application. In one embodiment, game server 352 might provide information within and/or with the detour analyzer about a defined configuration of the provided game client that may be used to detect modifications in the game client. Such information might include hash values of portions of the game client code, a protected copy of the defined configuration of the game client code, or the like.

Game server 352 may further receive and/or authenticate a request from a client device for access to an application. Gamer server 352 may partition a requested application into a plurality of components. In one embodiment, such partitioning may be performed differently for each request for the application. In another embodiment, the partitioning might be performed before a request is received. Game server 352 may also be employed to enable users to access, request, and/or play interactive, multi-player games over a network. As such, game server 352 may interact with CA 354 to determine whether a user is banned from playing a game, or has some other penalty imposed based on detection of cheat code on the user's client device.

CA 354 is configured to receive a plurality of hook signatures and parasite signature from a client device for determining whether a game client or other application has been modified with a cheat code. CA 354 may employ the hook signatures to identify one or more code elements that may then be analyzed. CA 354 may compare the code elements to data stored in data stores 360 to identify known cheat code elements. For example, an analysis of the hook signatures might show a pattern of hook addresses are being used within the game client. CA 354 may then examine data stores 360 to determine if the pattern of hook addresses identifies a known cheat code element. That is, has other known cheat codes used a similar pattern of hook addresses?

CA 354 is not limited to this example of detecting cheat code elements. For example, CA 354 might examine the parasite signature and hook signatures to identify text strings that are on a blacklist of known cheats. CA 354 might also to determine if the file format (PE, COFF, or the like) is destroyed. Such evidence might further indicate a cheat code element. CA 354 might examine a code near a landing address within the parasite code (from the parasite signature, for example) to determine if the code matches known cheat code in data stores 360.

Thus, CA 354 might examine the hook signatures and parasite signature to identify a plurality of code elements, some of which CA 354 may identify as cheat code elements. Other code elements might not be immediately identifiable as cheat code elements. For example, a code snippet from with the parasite code might not match data within data stores 360 that indicate that the code snippet is associated with known cheat code. Therefore, in one embodiment, CA 354 might mark such unidentifiable code elements as suspect.

CA 354 might perform additional analysis on such suspect code elements. For example, CA 354 might perform internet searches, examine other data stores, send messages to other sources, or the like, to attempt to identify the unidentifiable code elements. In one embodiment, CA 354 might attempt to execute the snippet of code, obtain additional related snippets of code for execution, or the like. Then based on how the snippet(s) of code operate, CA 354 may reclassify the code element as cheat code, safe code, or maintain its classification as suspect.

CA 354 may then determine a probability value based on the classifications of the code elements obtained from the plurality of hook signatures and parasite signatures. In one embodiment, each hook signature might generate a single code element. However, in another embodiment, a hook signature might generate a plurality of code elements. In still another embodiment, information from two or more hook signatures and/or the parasite signature might generate one or more separate code elements. In any event, a weighted sum of the code elements may be determined. In one embodiment, some code elements may have a higher relevancy to cheat detection than others. As such, some code elements might have a higher weighting than others. For example, a code element based on a pattern of hook addresses might have a lower weighting than a code element based on a text string, code that is determined to change a game play function, such as wall hacking, or the like.

CA 354 may examine the number of code elements obtained from the hook signatures and parasite signature to determine if the number of code elements is above a threshold value. That is, if the number of code elements is below the threshold, that CA 354 may select not to determine whether to impose a cheat prevention policy. Instead, in one embodiment, CA 354 may select to perform additional analysis, and/or store the received code elements marked as suspect code elements for future analysis.

By employing a threshold value before imposing cheat prevention policies, the invention provides protection from inadvertently banning a user based on minimal and/or insufficient information. Therefore, the threshold value is typically selected to provide a level of protection against such events. The number of code elements that may be used as the threshold value, of course may vary based on the game client, a confidence level desired, a type I/type II error level desired, or the like. In one embodiment, the threshold value might be between 2-5, however, other values may also be selected.

If the number of code elements is sufficient based on the threshold value, CA 354 may generate a weighted sum of code elements that are classified as known cheat code elements. CA 354 may generate a probability value based on a ratio of the total code elements to the cheat code elements. CA 354 may then select to implement game cheat preventions against the user of the client device, if the probability value exceeds some second threshold value. The second threshold value may be selected based on a variety of criteria, including, for example, a desired confidence level, a type I/type II error level desired, or the like. For example, in one embodiment, a threshold might be set between about 60% to about 80%. Thus for example, assuming equal weighting, if 16 code elements out of 20 code elements are identified as known cheat code elements, then the parasite code may be determined to be cheat code. In such a situation, the 4 code elements not identified as cheat code elements may, in one embodiment, be marked as cheat code elements and stored in a data store for future analysis. In this manner, parasite code that may be subsequently modified in an attempt to hide its cheat intended use might still be detected. Thus, cheat code may still be detected even where polymorphic changes to the cheat code may have occurred. In one embodiment, CA 354 may employ a process such as described below in conjunction with FIG. 6 to perform at least some of its actions.

It is noted that while game server 352 and CA 354 are illustrated as distinct components, the invention is not so limited. For example, in one embodiment, game server 352 and CA 354 might be integrated. Moreover, in still another embodiment, game server 352 and CA 354 might operate on different network devices.

Illustrative Hook/Parasite Signatures

Figure 4:
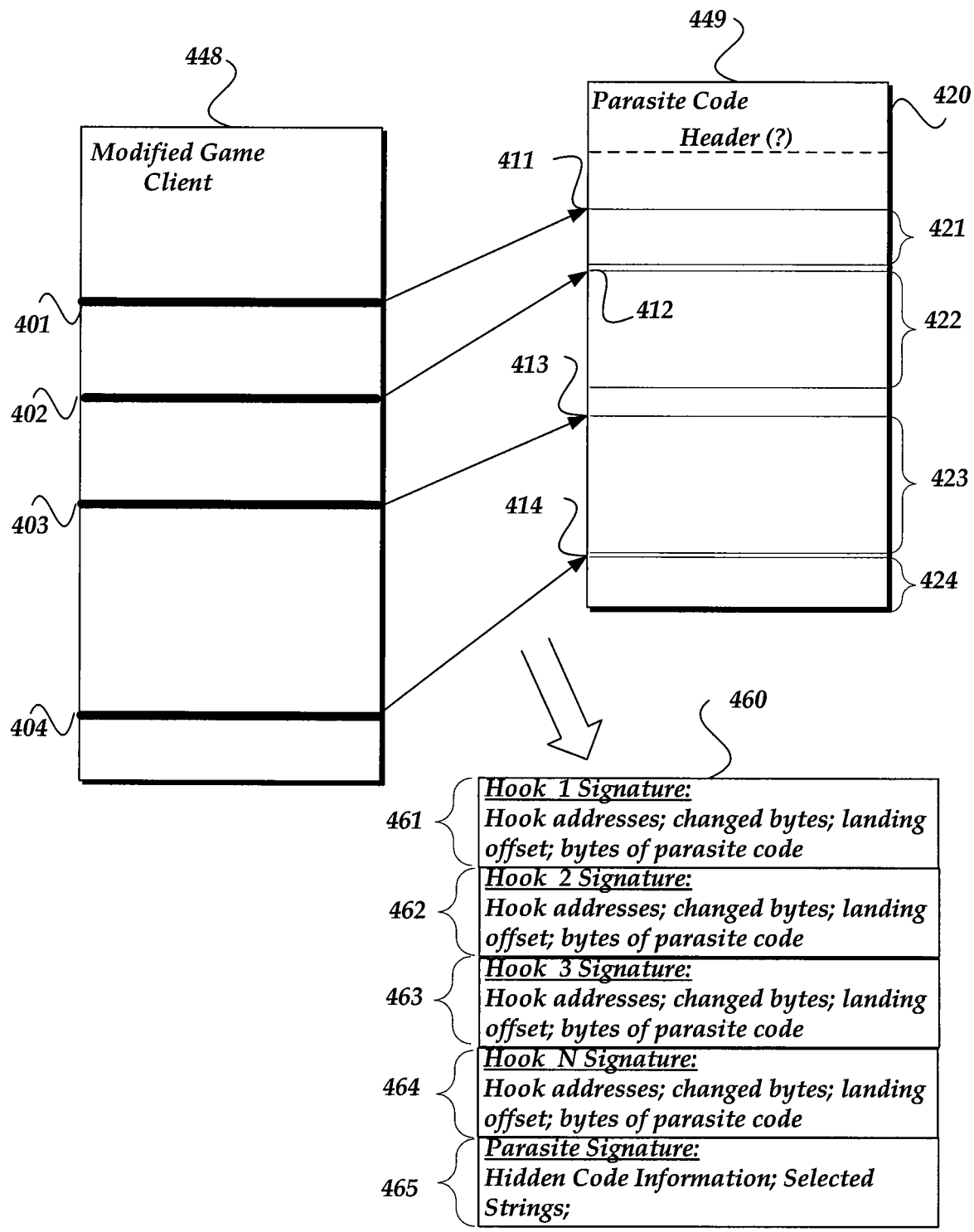
FIG. 4 illustrates one embodiment of hook/parasite signatures based on modified client code with hooks to suspect code.

FIG. 4 illustrates one embodiment of hook/parasite signatures based on modified client code with hooks to suspect code. Each of the components illustrated in FIG. 4 may include many more subcomponents than those shown. The subcomponents shown, however, are sufficient to disclose an illustrative embodiment for practicing the invention.

Shown in FIG. 4 is game client 448 and parasite code 449. Modified game client 448 represents one embodiment of a modified game client, such as a modified game client 248 of FIG. 2. Parasite code 449 represents suspect code to which one or more hooks within modified game client 448 are directed.

Shown within modified game client 448 are sections of code 401-404 which have been modified from a defined configuration of the game client code to include hooks. As shown, one hook is detected for each of the sections of code 401-404. It should be noted that each of sections of code 401-404 may be of a different number of bytes representing section of code within the game client code that is modified. Also shown are landing addresses 411-414 to which one of the hooks within modified game client 448 are directed within parasite code 449. It should be noted that, although not shown, typically, parasite code 449 may include a return instruction that, upon execution of some amount of code within parasite code 449, redirects execution back into modified game client 449.

Parasite code 449 may include a header 420 that represents a format header, such as a PE header, COFF header, or the like. As noted above, however, header 420 might be deleted, and/or otherwise obfuscated so that it may not be detectable, useable, or otherwise present.

Additionally, parasite code 449 includes snippets of code or variable lengths of executable code instructions 421-424. As seen, for example, a hook within section of code 401 might land at landing address 411 within parasite code 449. Code instructions 421 might then execute, terminating, in one embodiment, with a return, jump, branch, or other instruction that redirects a flow of execution of instructions back into modified game client 448. Code instructions 422-424 illustrate similar actions.

Code instructions 422-424 may also include text strings useable to identify a source of parasite code 449, identify characters used within modified game client 448, or other information useable to identify whether parasite code 449 is cheat code, or not.

Also shown within FIG. 4 is one non-limiting, non-exhaustive example of hook/parasite signatures 460. That is, hook/parasite signatures 460 may include one or more hook signatures 461-464, and parasite signature 465. Typically, for each improper hook identified within modified game client 448 is a corresponding hook signature.

As shown, hook signatures 461-464 may include, but are not limited to hook addresses that indicate a starting address in the modified game code, a hook landing address in the parasite code, a changed number of bytes in the game client and/or the changed bytes from the modified game client, a landing offset within the parasite code from the landing address and/or a number of bytes of code within the parasite code from the landing address. For example, in one embodiment, a predetermined number of bytes of code (sometimes called a code snippet) within the parasite code might be included in a hook signature. In one embodiment, the number of bytes might be set to a constant number. However, the invention is not so limited. In another embodiment, a number of bytes in the code snippet might be based on whether text strings are detected, whether particular code instructions are detected such as those that might change known game elements, or the like.

As noted, if a text string is detected, the text string might be analyzed to determine whether the text string provides potentially useful information. Thus, in one embodiment, selected text strings might be placed on a white list, or similar mechanism, such that if they are detected within the parasite code being examined, they may be ignored. For example, common texts strings, such as days of the week, month, years, colors, or the like, might be ignored as not potentially useful information. Text strings that may include names of game characters, terms such as "wall hack," names of known hackers, cheaters, cheat projects, or the like, might be non-limiting examples of potentially useful text strings.

As illustrated parasite signature 465 may include information indicating whether attempts to hide the parasite code, its intended purpose, or the like, might be included, along with other information such as the text strings located with the parasite code, path information file names, or the like, a size of the parasite code memory region, and/or other information about the parasite code that may indicate whether parasite code 449 is cheat code, or not.

In any event, hook signatures 461-464 might be implemented as a concatenation of one or more of the extracted information noted above. Moreover, the parasite signature 465 might further be implemented as a concatenation of one or more of the extracted information noted above. Further, hook signatures 461-464 and parasite signature 465 may be concatenated together into hook/parasite signatures 460. However, the invention is not constrained to a particular structure and/or format for hook/parasite signatures 460, and others may also be used, without departing from the scope of the invention.

Generalized Operation

Figure 5:
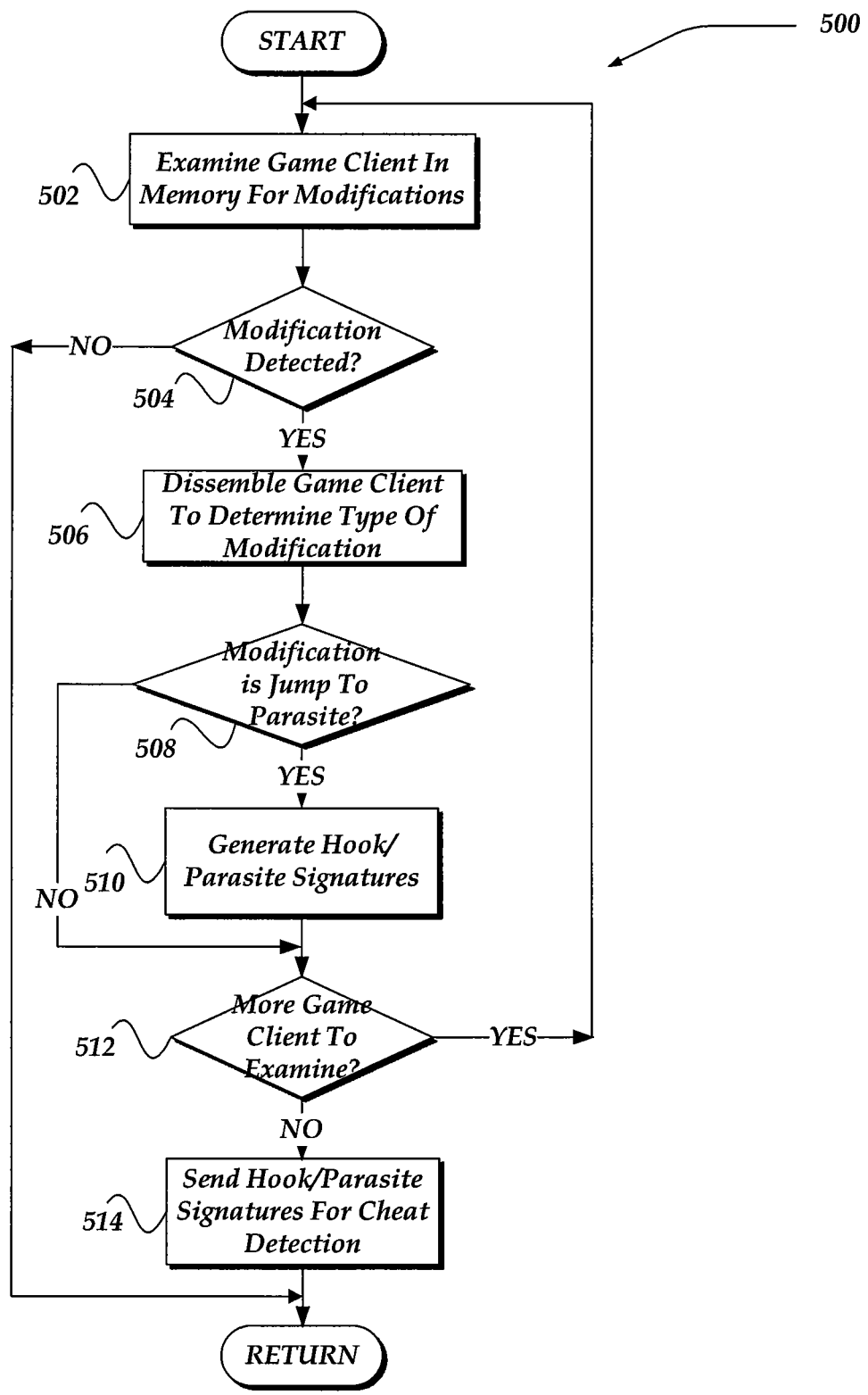
FIG. 5 illustrates a flow chart for one embodiment of a client device process of collecting signature information about a possible cheat activity based on modifications to code.

The operation of certain aspects of the invention will now be described with respect to FIGS. 5-6. FIG. 5 illustrates a flow chart for one embodiment of a client device process of collecting signature information about a possible cheat activity based on modifications to code. Process 500 of FIG. 5 may be implemented within a component, such as detour analyzer 246 of FIG. 2, or the like.

Process 500 may start, based on various triggers, such as detection that a game client or other application is loaded into memory space on a client device, based on a time event, or other trigger event.

Process 500 begins, after a start block, at block 502, where the game client in memory is analyzed for modifications from a defined game client configuration. The defined game client configuration may be defined based on a copy of the game client provided to the client device, a set of hash values, or the like.

Cheat code modifications typically are located within a game client around areas that perform input or output actions, writes to some location, reads from some location, or performs similar actions. Therefore, in one embodiment, the analysis for modifications may be directed to sections of the game client that include such actions.

In one embodiment, the comparisons may be performed using hash values, CRC values, and/or a byte by byte comparison to the defined game client configuration. In one embodiment, the comparisons may be performed a memory page at a time. However, the invention is not limited to these mechanisms, and other approaches may be used to determine if the game client is modified based on the defined game client configuration.

In any event, processing flows to decision block 504, where a determination is made whether a modification is detected. If a modification is detected, processing flows to block 506; otherwise, processing may return to a calling process to perform other actions.

At block 506, a section of the game client code may be examined to determine a type of modification. In one embodiment, the game client code may be examined using a dissembler, or other mechanism. For example, the game client code instructions may each be examined to detect the modification type.

Processing flows next to decision block 508, where a determination is made whether the modification is a hook that detours a flow of execution of the game client code to another code program, snippet of code, or the like, that is detected to be 'foreign' or not part of the defined game client configuration. Such other code program may be defined as a parasite code program that may warrant additional analysis. However, if the hook detours to code within the game client configuration or other valid memory regions based on operating system constraints, memory problems, or the like, then these hook detours may be ignored. Thus, if the modification detours to parasite code, processing flows to block 510; otherwise, processing branches to decision block 512.

At block 510, analysis as described above may be performed to generate a hook signature and parasite signature, such as those described above. Processing then flows to decision block 512.

At decision block 512, a determination is made whether there is more game client code to examine for modifications. If so, then processing loops back to block 502; otherwise, processing flows to block 514. Typically, if the parasite code is cheat code, a plurality of hooks may be detected. Thus, a plurality of hook signatures might be generated, while a single parasite signature might be generated. However, the invention is not so constrained. For example, in one embodiment, a plurality of parasite signatures might be generated. In one embodiment, the hook signatures and parasite signature(s) may be combined into a hook/parasite signature structure.

At block 514, the hook/parasite signatures may then be sent over a network to a remote network device for analysis.

In one embodiment, the hook/parasite signatures may be encrypted prior to be sent. In another embodiment, the hook/parasite signatures may be sent over an encrypted communication link. In one embodiment, the hook signatures may be sent separately, and/or separate from the parasite signature. In any event, processing may then return to a calling process to perform other actions.

Figure 6:
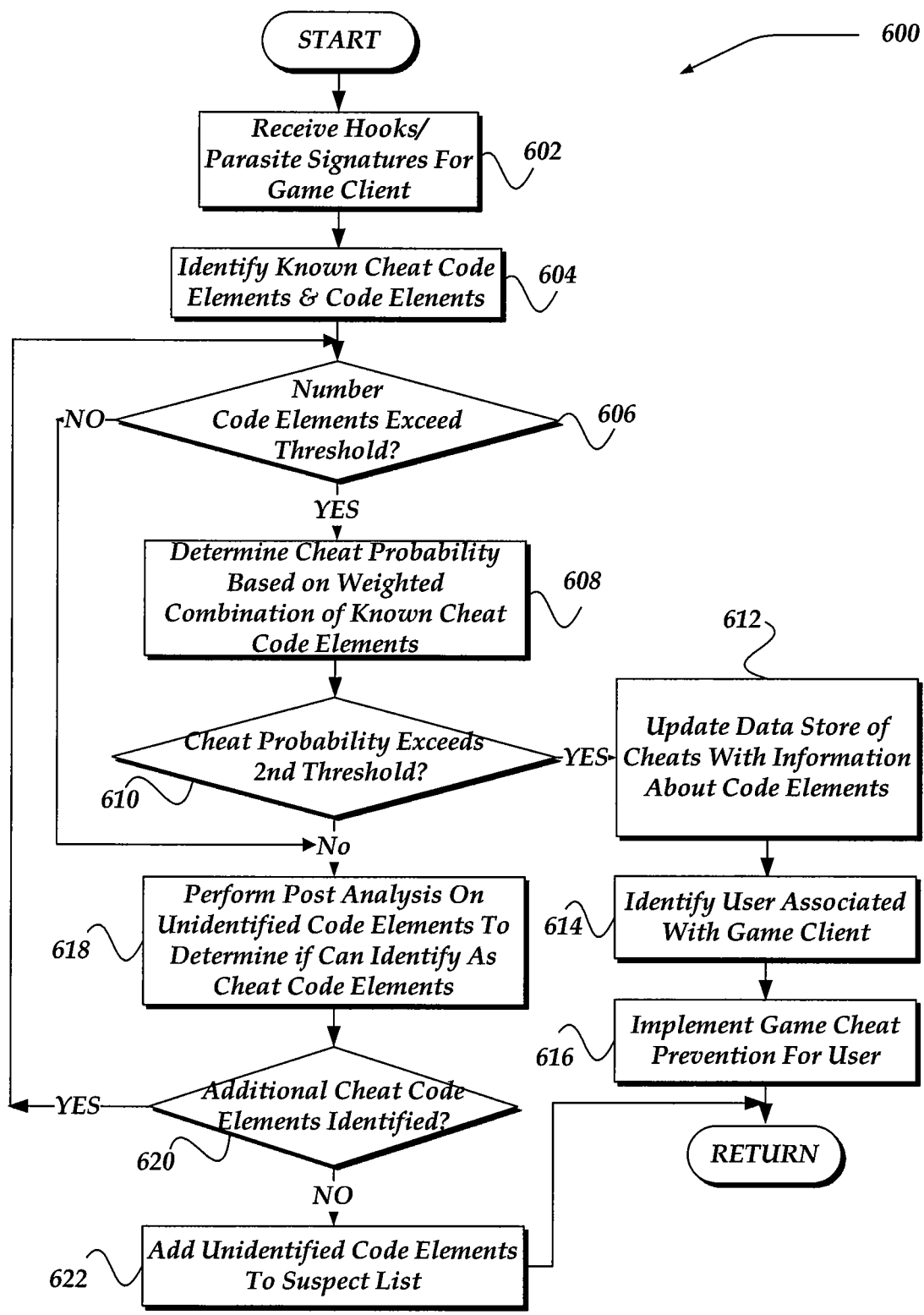
FIG. 6 illustrates a flow chart for one embodiment of a process of analyzing signature information from a client device to determine a cheat presence.

FIG. 6 illustrates a flow chart for one embodiment of a process of analyzing signature information from a client device to determine a cheat presence. Process 600 of FIG. 6 may be performed within CAS 107 of FIG. 1, in one embodiment. However, in another embodiment, process 600 may be performed within content server 106 of FIG. 1.

Process 600 begins after a start block at 602, where hook/parasite signatures are received from a client device. Processing continues to block 604, where the hook/parasite signatures are examined as described above to identify code elements. Further each of the code elements are further examined against contents of a data store to determine if the code element is identifiable as a known cheat code element.

Continuing to decision block 606 a determination is made whether a number of code elements obtained from the hook/parasite signatures exceeds a first threshold. That is, is there sufficient information such that a desired level of confidence may be had for detecting cheat code for the associated parasite code? As noted above, the threshold value may be virtually any number, including, for example, between 2-5. In any event, if there are insufficient numbers of code elements based on the first threshold value, then processing loops to block 618; otherwise, processing flows to block 608.

At block 608, a cheat probability is determined as described above based on a weighted combination of the known cheat code elements and total number of code elements obtained. Continuing to decision block 610, a determination is then made whether the cheat code probability exceeds a second threshold value. If the cheat probability exceeds the second threshold value, then the parasite code is determined to be cheat code, and processing flows to block 612; otherwise, processing flows to block 618.

At block 612, those code elements that were not explicitly identified as cheat code elements may be marked, in one embodiment, as cheat code elements. A data store may then be updated such that polymorphic changes to the parasite code might be detected more quickly. Processing further flows to block 614, where a user associated with the game client is determined. In one embodiment, a data store might be queried to identify the user, an account identifier, or the like. Processing then flows to block 616 where a game cheat prevention policy is employed to determine a response based on the determination that the parasite code is cheat code. One such policy might indicate that the user is to be banned from playing another interactive multi-player game. However, other actions might also be imposed, including, but not limited to sending a warning message to the user, and then if the user is detected to be employing cheat codes more than some number of times, imposing a more severe restriction. In another embodiment, the user's name might be posted on a website, or the like, indicating that the user has been detected using cheat codes. However, the invention is not limited to these approaches to prevent additional cheat code usage, and others may also be employed. Processing then returns to a calling process to perform other actions.

At block 618, however, additional analysis may be performed on the code elements that are not currently defined as non-cheat code elements, or cheat code elements. Moreover, the hook signatures and/or parasite signature may be further analyzed to determine whether there might be other code elements that were not previously identified at block 604. In one embodiment, for example, a post analysis may be performed, such as searching various bulletin-boards, chat groups, websites, or the like, for information that may indicate whether additional code elements may be identified and/or whether any of the code elements can be identified as cheat code elements.

In one embodiment, one or more portions of the parasite code might be executed to determine how it acts. If the actions indicate that the parasite code is cheat code, then the code elements associated with the executed portions might be reclassified. It should be noted that the invention is not limited to these mechanisms for further identifying cheat code elements, and other approaches may also be used.

In any event, processing flows to decision block 620 where a determination is made whether additional cheat code elements (and/or additional code elements) have been identified. If so, processing loops back to decision block 606; otherwise, processing flows to block 622.

At block 622, the code elements not identified as cheat code elements may be added to a suspect list for future analysis. Moreover, in one embodiment these unidentified code elements may also be stored in a data store, or the like. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device useable in managing detecting cheat code in a executable code, comprising:
   a network interface component for receiving and sending information over a network;
   a processor, in communication with the network interface component that includes machine instructions that cause the processor to perform operations, including:
      receiving a hook/parasite signature from a client device that, comprises a hook signature and a parasite signature, the hook/parasite signature provides information about modification to a game client and a suspect code residing on the client device, and information about a hook from the game client to the suspect code;
      analyzing code elements obtained from the hook/parasite signature information to detect known cheat code elements;
      determining whether a number of the code elements obtained from the hook/parasite signature information exceeds a threshold;
      responsive to determining that the number of code elements exceeds the threshold,
         generating a probability value based on a weighted combination of the cheat code elements;
         when the probability value indicates that the suspect code is game cheat code, implementing a cheat prevention policy that includes inhibiting participation by a user associated with the client device in a subsequent use of the game client; and
         storing information from the hook/parasite signature for use in detecting changes to the suspect code directed toward hiding the cheat code elements.

2. The network device of claim 1, wherein receiving a hook/parasite signature from a client device further comprises receiving from a client detour analyzer residing on the client device, the client detour analyzer being configured to perform a comparison of the game client in memory to a master copy of the game client.

3. The network device of claim 1, wherein the hook/parasite signature includes at least one of an address in the game client where the hook is located, a landing offset inside of the suspect code where the hook detours execution flow from the game client to the suspect code, or at least a portion of the suspect code in proximity to a landing address into the suspect code.

4. The network device of claim 1, wherein analyzing the hook/parasite signature further comprises at least one of:
   examining a data store to identify known cheat code elements within the hook/parasite signature;
   executing at least a portion of the suspect code to determine if the suspect code operates as a cheat code element; or
   examining text strings within the hook/parasite signatures to determine if one or more of the text strings are on a blacklist of text strings indicating a cheat code element.

5. The network device of claim 1, wherein generating a probability value further comprises:
   summing weighted values for each of the cheat code elements;
   determining a weighted value for each unidentifiable code element and cheat code elements; and
   dividing the weighted values for each of the cheat code elements by the weighted value for each unidentifiable code element and cheat code elements to generate the probability value.

6. The network device of claim 1, wherein storing information from the hook/parasite signature further comprises:
   when the suspect code is detected as game cheat code, further identifying any code elements from the hook/parasite signature that is not identified as cheat code elements, also as cheat code elements.

7. The network device of claim 1, wherein the hook/parasite signature includes a plurality of hook signatures each hook signature being associated with information about a detected hook in the game client, and each hook signature provides information about at least one code element.

8. A method of operating a network device useable in managing detecting cheat code in a executable code, the method comprising:
- receiving a hook/parasite signature from a client device that comprises a hook signature and a parasite signature, the hook/parasite signature provides information about modification to a game client and a suspect code residing on the client device, and information about a hook from the game client to the suspect code;
- analyzing code elements obtained from the hook/parasite signature information to detect known cheat code elements;
- determining whether a number of the code elements obtained from the hook/parasite signature information exceeds a threshold;
- responsive to determining that the number of code elements exceeds the threshold,
  - generating a probability value based on a weighted combination of the cheat code elements;
  - when the probability value indicates that the suspect code is game cheat code, implementing a cheat prevention policy that includes inhibiting participation by a user associated with the client device in a subsequent use of the game client; and
  - storing information from the hook/parasite signature for use in detecting changes to the suspect code directed toward hiding the cheat code elements.

9. The method of claim 8, wherein receiving a hook/parasite signature from a client device further comprises receiving from a client detour analyzer residing on the client device, the client detour analyzer being configured to perform a comparison of the game client in memory to a master copy of the game client.

10. The method of claim 8, wherein the hook/parasite signature includes at least one of an address in the game client where the hook is located, a landing offset inside of the suspect code where the hook detours execution flow from the game client to the suspect code, or at least a portion of the suspect code in proximity to a landing address into the suspect code.

11. The method of claim 8, wherein analyzing the hook/parasite signature further comprises at least one of:
- examining a data store to identify known cheat code elements within the hook/parasite signature;
- executing at least a portion of the suspect code to determine if the suspect code operates as a cheat code element; or
- examining text strings within the hook/parasite signatures to determine if one or more of the text strings are on a blacklist of text strings indicating a cheat code element.

12. The method of claim 8, wherein generating a probability value further comprises:
- summing weighted values for each of the cheat code elements; determining a weighted value for each unidentifiable code element and cheat code elements; and
- dividing the weighted values for each of the cheat code elements by the weighted value for each unidentifiable code element and cheat code elements to generate the probability value.

13. The method of claim 8, wherein storing information from the hook/parasite signature further comprises:
- when the suspect code is detected as game cheat code, further identifying any code elements from the hook/parasite signature that is not identified as cheat code elements, also as cheat code elements.

14. The method of claim 8, wherein the hook/parasite signature includes a plurality of hook signatures each hook signature being associated with information about a detected hook in the game client, and each hook signature provides information about at least one code element.

15. A nontransitory processor-readable storage medium storing instructions or data that, when executed by a network device, cause the network device to perform operations including:
- receiving a hook/parasite signature from a client device that comprises a hook signature and a parasite signature, the hook/parasite signature provides information about modification to a game client and a suspect code residing on the client device, and information about a hook from the game client to the suspect code;
- analyzing code elements obtained from the hook/parasite signature information to detect known cheat code elements;
- determining whether a number of the code elements obtained from the hook/parasite signature information exceeds a threshold;
- responsive to determining that the number of code elements exceeds the threshold,
  - generating a probability value based on a weighted combination of the cheat code elements;
  - when the probability value indicates that the suspect code is game cheat code, implementing a cheat prevention policy that includes inhibiting participation by a user associated with the client device in a subsequent use of the game client; and
  - storing information from the hook/parasite signature for use in detecting changes to the suspect code directed toward hiding the cheat code elements.

16. The nontransitory processor-readable storage medium of claim 15, wherein receiving a hook/parasite signature from a client device further comprises receiving from a client detour analyzer residing on the client device, the client detour analyzer being configured to perform a comparison of the game client in memory to a master copy of the game client.

17. The nontransitory processor-readable storage medium of claim 15, wherein the hook/parasite signature includes at least one of an address in the game client where the hook is located, a landing offset inside of the suspect code where the hook detours execution flow from the game client to the suspect code, or at least a portion of the suspect code in proximity to a landing address into the suspect code.

18. The nontransitory processor-readable storage medium of claim 15, wherein analyzing the hook/parasite signature further comprises at least one of:
- examining a data store to identify known cheat code elements within the hook/parasite signature;
- executing at least a portion of the suspect code to determine if the suspect code operates as a cheat code element; or
- examining text strings within the hook/parasite signatures to determine if one or more of the text strings are on a blacklist of text strings indicating a cheat code element.

19. The nontransitory processor-readable storage medium of claim 15, wherein generating a probability value further comprises:
- summing weighted values for each of the cheat code elements; determining a weighted value for each unidentifiable code element and cheat code elements; and dividing the weighted values for each of the cheat code elements by the weighted value for each unidentifiable code element and cheat code elements to generate the probability value.

20. The nontransitory processor-readable storage medium of claim 15, wherein storing information from the hook/parasite signature further comprises:
when the suspect code is detected as game cheat code, further identifying any code elements from the hook/parasite signature that is not identified as cheat code elements, also as cheat code elements.

\* \* \* \* \*